Jan. 14, 1964 R. POLK, JR 3,117,601
APPARATUS FOR SECTIONIZING CITRUS FRUIT
Filed March 9, 1961 3 Sheets-Sheet 1
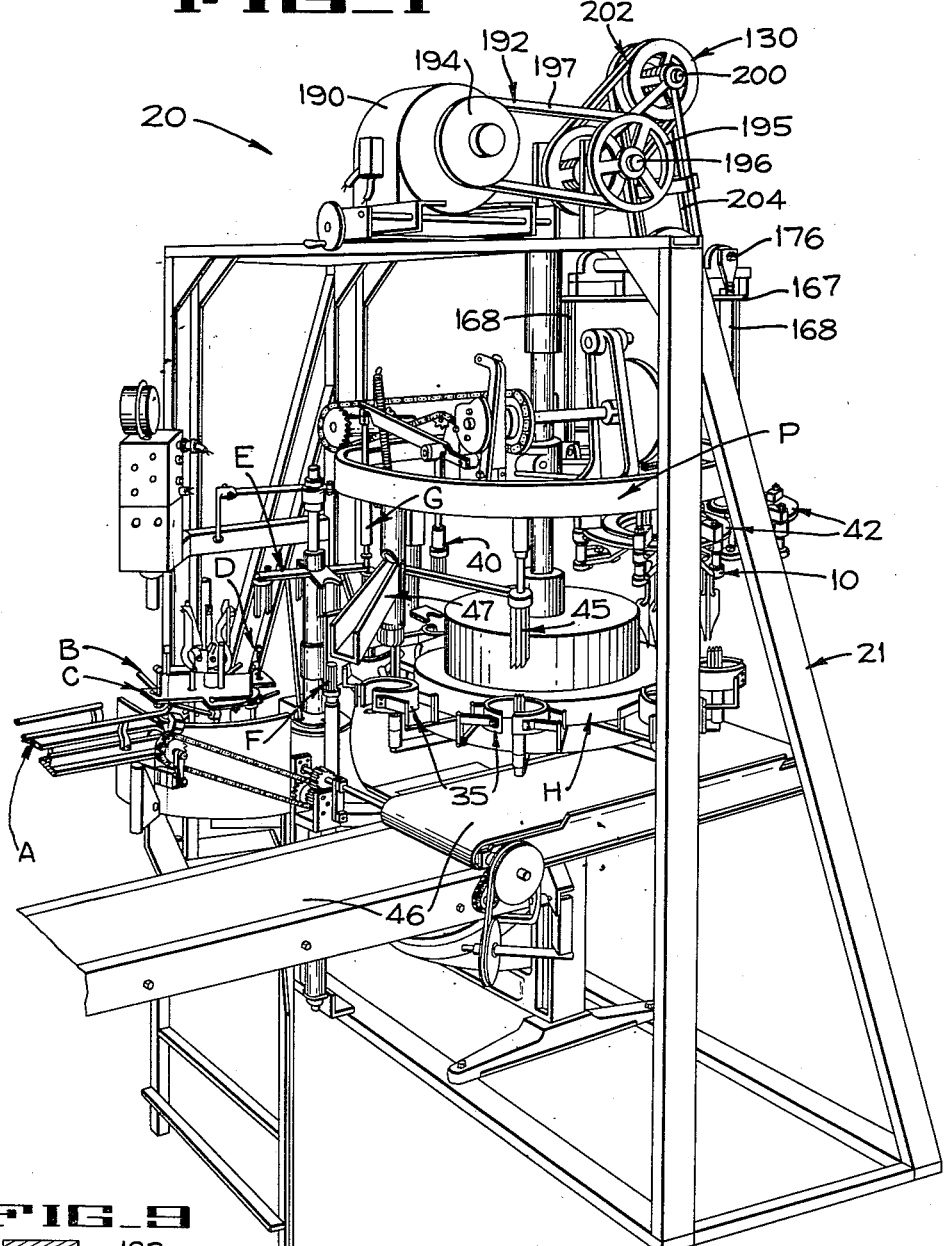
FIG_1
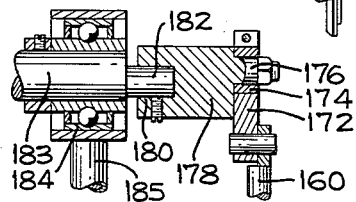
FIG_9
INVENTOR
RALPH POLK, JR.
BY Hans G. Hoffmeister
ATTORNEY Jan. 14, 1964    R. POLK, JR    3,117,601
APPARATUS FOR SECTIONIZING CITRUS FRUIT
Filed March 9, 1961    3 Sheets-Sheet 2
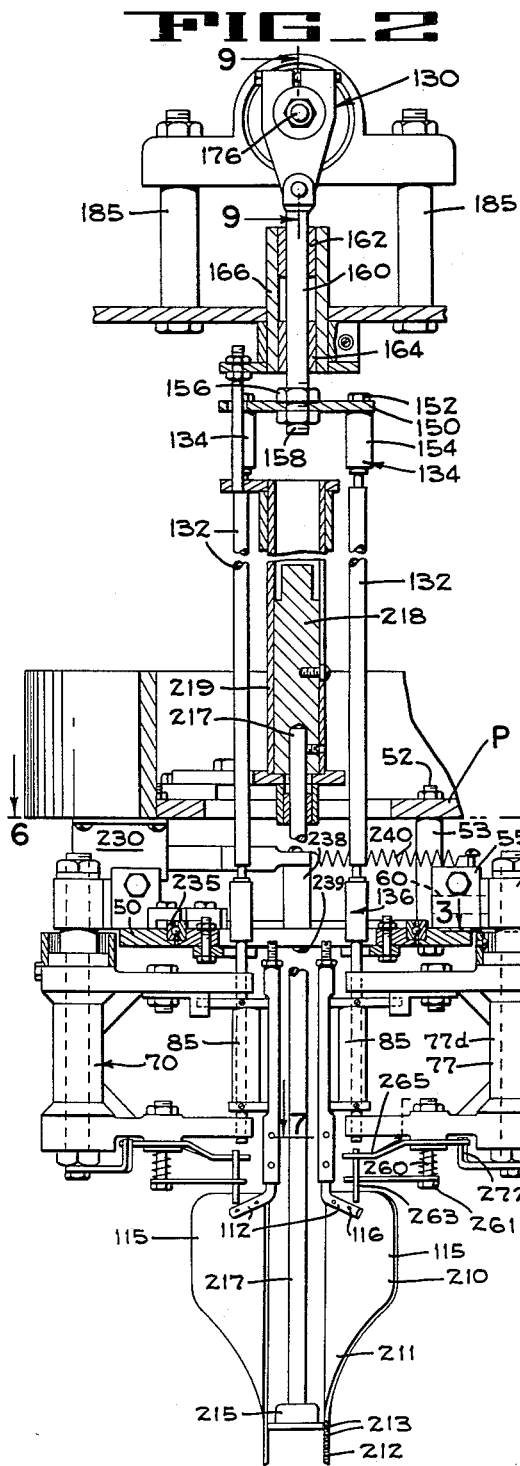
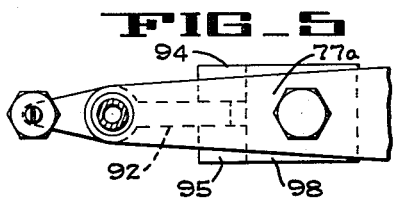
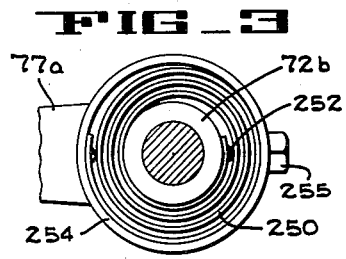
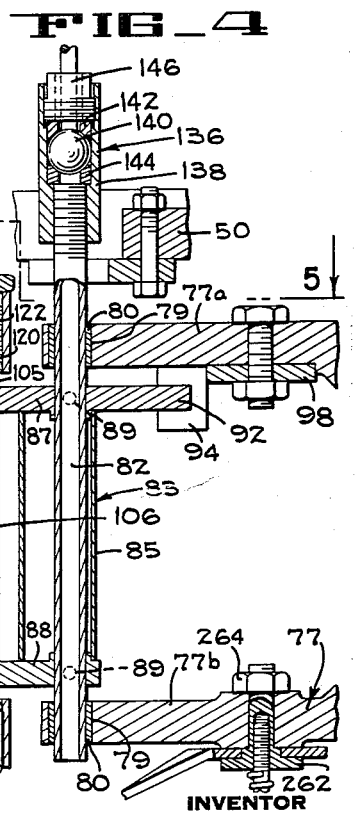
INVENTOR
RALPH POLK, JR.
BY Hans G. Hoffmeister
ATTORNEY

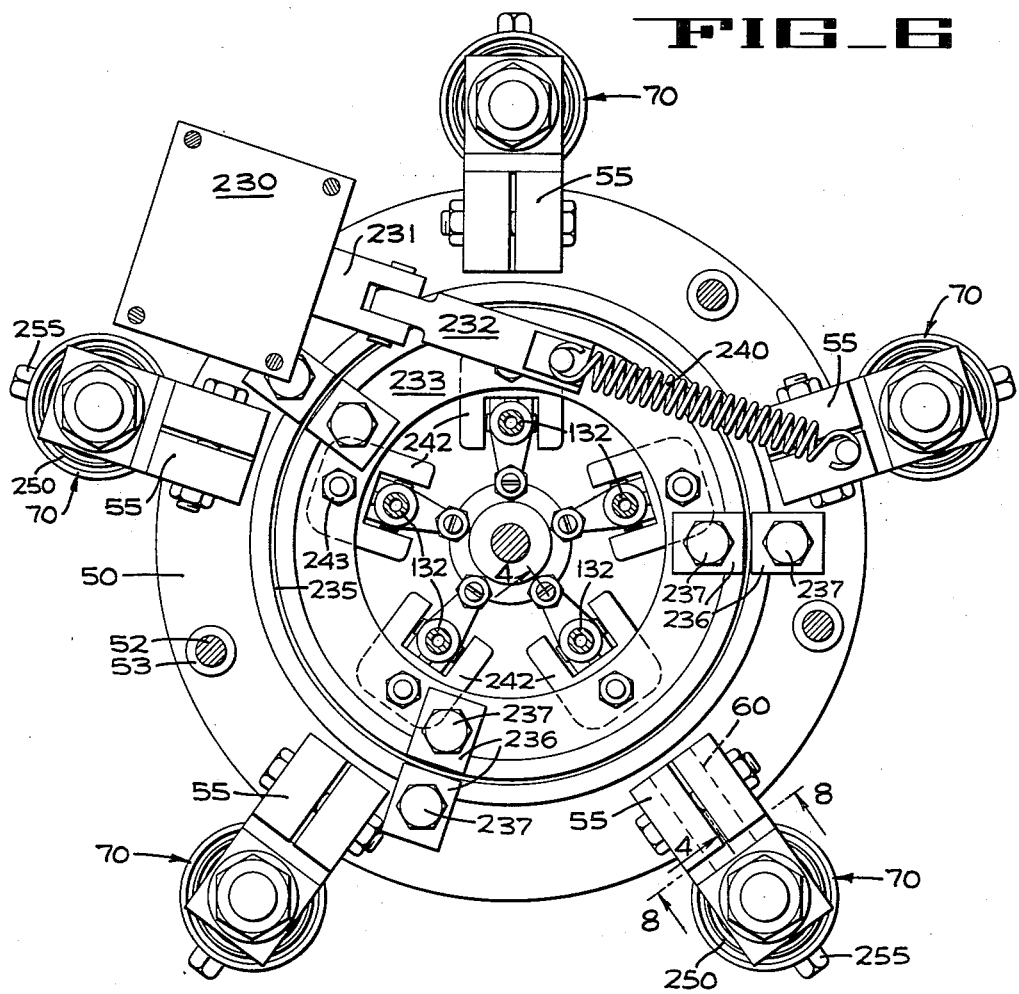
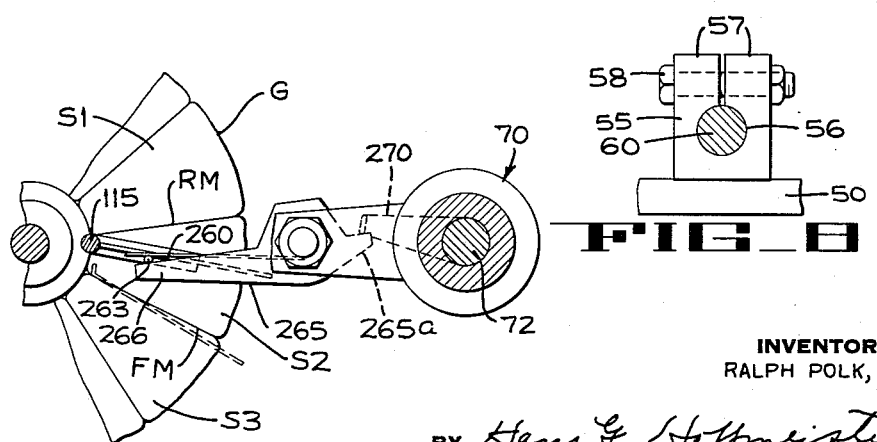

United States Patent Office
3,117,601
Patented Jan. 14, 1964

3,117,601
APPARATUS FOR SECTIONIZING CITRUS FRUIT
Ralph Polk, Jr., Box 3208, Tampa, Fla.
Filed Mar. 9, 1961, Ser. No. 109,799
2 Claims. (Cl. 146—3)

This invention pertains to apparatus for sectionizing citrus fruit, and more particularly concerns an improved mechanism for supporting and controlling the movements of a sectionizing blade.

In the citrus fruit processing industry, machines have been developed for removing the meat segments from between the membranes that extend radially outwardly from the core of the fruit to the periphery. One of these machines makes use of a vertically disposed blade that is moved down into the fruit at the apex defined by two adjacent radial membranes of the fruit, while the fruit is held in fixed position with its core axis extending in a generally vertical direction. After the blade penetrates a short distance down into the fruit, it is moved laterally until it engages the adjacent membrane. Then the blade, which is being vibrated in a vertical direction, is moved downwardly again until it passes through the fruit. If it is desired that the blade move laterally in one particular direction, for example, to the right, it must be preliminarily moved to the left to a spring-loaded cocked position so that, after it penetrates the fruit, it will have the ability to move to the right under self-adjusting spring pressure. This sidewise movement of the blade to the right and to the left is accomplished by mounting the blade on a member that swings about a vertical axis. Several mechanisms have been developed to permit the blade to vibrate vertically while moving sidewise with its pivoting support member. None of these mechanisms have been entirely satisfactory because they do not permit straight up and down movement of the vibrating blade but rather introduce other undesirable movements, such as movement of the blade in a direction away from the core of the fruit.

Accordingly, it is an object of the present invention to provide an improved mounting mechanism for a citrus fruit sectionizing blade.

Another object is to provide a blade mounting mechanism which will permit straight line vertical movement of the blade while it is being swung laterally by its pivotal carrier.

Another object is to provide a blade mounting mechanism which will permit straight line vertical movement of the blade on a pivotal carrier but will prevent pivotal or rotary movement of the blade relative to the carrier.

Other and further objects and advantages of the present invention will become apparent from the following description taken in connection with the accompanying drawings, in which:

FIGURE 1 is a more or less diagrammatic perspective of a citrus fruit sectionizing machine embodying the blade mounting mechanism of the present invention.

FIGURE 2 is a fragmentary, enlarged vertical section, with parts broken away, taken substantially centrally through one of the sectionizing heads of the machine of FIGURE 1, showing a portion of the blade vibrating mechanism also.

FIGURE 3 is an enlarged horizontal section taken along line 3—3 of FIGURE 2.

FIGURE 4 is an enlarged vertical section taken substantially centrally through one blade mounting assembly of one of the sectionizing heads, the section being taken substantially on line 4—4 of FIGURE 6.

FIGURE 5 is a fragmentary horizontal section taken on line 5—5 of FIGURE 4.

FIGURE 6 is an enlarged horizontal section taken along line 6—6 of FIGURE 2.

FIGURE 7 is a diagrammatic horizontal section, with parts broken away, taken substantially along line 7—7 of FIGURE 2.

FIGURE 8 is a vertical section taken along line 8—8 of FIGURE 6.

FIGURE 9 is a fragmentary vertical section taken along line 9—9 of FIGURE 2.

In FIGURE 1, one embodiment 10 of the blade actuating mechanism of the present invention is shown operatively mounted in a citrus fruit sectionizing machine 20 of the type disclosed in the copending application for U.S. patent of Wilber C. Belk and Ralph Polk, Jr., Ser. No. 823,176, filed June 26, 1959, now Patent No. 3,044,729.

In general, the machine comprises a frame support structure 21 (FIG. 1) made up of channels and angle members rigidly welded together. The peeled and treated grapefruit, which are to be sectionized, are advanced on a supply conveyor A to a position within reach of an operator who stands in front of a rotary feed turret B and places each grapefruit on the feed turret at station C of the turret with the axis of the fruit extending in a generally vertical direction. The feed turret B is intermittently indexed through 90° angular increments in a clockwise direction to bring each grapefruit to a transfer station D where the grapefruit is automatically transferred from the feed turret B to a transfer turret E which is also arranged to be intermittently indexed in 90° increments in synchronism with the movements of the feed turret B, but in a counterclockwise direction. The grapefruit is then moved to a seed disturbing station F and then to a second transfer station G where it is deposited in one of a plurality of fruit carriers 35 mounted on a main turret H. The main turret is arranged to be intermittently indexed through 45° angular increments in a clockwise direction to move each grapefruit successively into operative association with a seed disturber unit 40 and with four substantially identical sectionizing heads 42, only the third and fourth heads being shown in FIGURE 1. All four heads 42 are carried by and project downwardly from a vertically movable tool carrier or plate P. Each head has a plurality of blades, which will be described presently, that are arranged to be vibrated rapidly in a vertical direction as they are moved downwardly into a grapefruit to separate the pie-shaped meat segments from the membranes enclosing them. The sectionized grapefruit, with the separated segments disposed around the core, is then brought under a spinner or stripper unit 45 that wraps the radial membranes around the stationary core, causing any remaining bond between the membranes and the segments to be completely broken and causing the segments to drop onto a discharge conveyor 46. The core is then moved to a position under a stripping mechanism 47 which removes the core from the fruit carrier.

The mechanisms of the machine, including the supply conveyor A, the feed turret B, the transfer turret E, the main turret H, the discharge conveyor 46, and the drive mechanism for the conveyors and turrets are substantially identical to those disclosed and referred to in the above-mentioned copending application of Belk and Polk, and reference may be had to said application for a detailed description of the construction and operation of the apparatus not described in detail hereinafter.

The present invention is particularly concerned with an improved mechanism for permitting rapid vibrating movement of each blade of each head 42 while controlling the pivoting movement of the blade as it is moved in a generally horizontal direction toward a radial membrane of a grapefruit. While the improved mechanism of the present invention is particularly adapted for use in the sectionizing machine 20 (FIG. 1), it will be understood that it has general utility in any citrus fruit sectionizing machine in which a blade is moved through the fruit with a vibrating movement to separate the meat segments from the enclosing membranes.

All of the four sectionizing heads 42 are substantially identical. Accordingly, a description of one head will be sufficient to disclose the structure and operation of all of the heads. As seen in FIGURES 2 and 6, each head comprises a rigid ring 50 that is supported under the tool carrier plate P by three bolts 52 which extend through spacer sleeves 53 to mount the ring in fixed position a predetermined distance below the plate P. Five equi-spaced clamping blocks 55 (FIG. 6) are welded to the upper surface of the ring, each block having a cylindrical opening 56 (FIG. 8) defined by two spaced clamp arms 57 through which a bolt 58 projects. The opening 56 is arranged to receive, in clamped engagement, a short rod 60 (FIG. 2) projecting from a support block 61 which has a vertical cylindrical opening 62.

Each of the five clamping blocks 55 supports an identical blade control unit 70 which includes a shaft 72 that has a portion 72a held in fixed position in the vertical opening 62 between a nut 74 and an enlarged portion 72b of the shaft 72. A blade control member 77 has a tubular portion 77d journalled for rotation on the fixed shaft 72 by means of ball bearing assemblies (not shown) disposed around the shaft 72 interiorly of hub portions 78 of the control member 77. The member 77 has two laterally projecting arms 77a and 77b (FIG. 4) each of which is provided, near its outer free end, with an opening 79 in which a bushing 80 is disposed. These spaced openings 79 slidably receive a tubular shaft 82 which is part of the blade support mechanism 83 that is a feature of the present invention. Besides the control member 77 and the tubular shaft 82, the blade support mechanism 83 includes a housing 85 that encloses the shaft 82 and is secured, as by welding to an upper arm 87 and a lower arm 88. Each of the arms 87 and 88 has an opening in which the shaft 82 is secured by a setscrew 89. Thus, the shaft 82, the arms 87 and 88, and the housing 85 form a rigid blade carrier that is mounted for vertical sliding movement at the outer ends of the arms 77a and 77b of control member 77. The upper arm 87 has a rearwardly projecting portion 92 which is slidably disposed in a vertical channel defined by two spaced guide blocks 94 and 95 (FIG. 5) which are integrally formed on a plate 98 that is bolted to the under side of arm 77a. The spaced guide blocks 94 and 95 permit vertical reciprocating movement of the blade carrier unit 90 but prevents rotation of the unit relative to the control member 77.

As seen in FIG. 4, each of the upper and lower arms 87 and 88 has a pivot pin 105 pressed in its outer end portion which projects through an elongate opening 106 cut in the side of a tube 110. The pivot pin in the lower arm 88 has a conical point pivotally seated in a bearing 108 that is disposed in the tube 110 which also receives a rod 112 projecting upwardly from a sectionizing blade 115 (FIG. 2). The rod 112 is secured to blade 115 by rivets 116 and to tube 110 by rivets 117 (FIG. 4). The pivot pin 105 on the upper arm 87 has a conical end pivotally engaged in a bearing 120 which is slidably disposed in the upper end of the tube 110. The upper end of tube 110 is internally threaded to receive an adjusting screw 122 that bears against the slidable bearing 120. The screw 122 has a screw driver slot 124 in its upper end and, by rotating screw 122, the bearing 120 can be adjusted to lock the blade on the carrier unit 90 for free pivotal movement about the axis defined by the pivot pins. A locknut 126 is threaded on the upper end of adjusting screw 122 to lock it in the selected position.

Each sectionizing head 42 has five blades 115, and all of the blades of a particular head 42 are simultaneously vibrated in a vertical direction by means of an eccentric drive mechanism 130 (FIGURES 1 and 2) which includes five tubular rods 132 (FIG. 6), each of which supports one blade. As best seen in FIGURE 2, each rod 132 has a universal joint 134 near its upper end and an identical joint 136 near its lower end. The lower joint includes an internally threaded sleeve 138 (FIG. 4) which receives the upper threaded end of the shaft 82 of carrier unit 90. A ball pivot member 140 carried by the lower end of rod 132 is disposed between two seat members 142 and 144 in the upper end of the sleeve 138. A tubular retainer screw 146 is threaded in the upper end of the sleeve 138 to hold the members of the universal joint in operative association. The upper universal joint 134 is similar to joint 136 but is inverted and is locked on a carrier plate 150 (FIG. 2) by a screw 152 that is threaded in the outer sleeve 154 of the joint.

The carrier plate 150 is mounted by means of nuts 156 and 158 on the lower end of an actuating rod 160 which is slidably journalled in bushings 162 and 164 disposed in a tubular mounting member 166. The mounting member 166 is welded in a support plate 167 which is rigidly connected to the top plate P by means of a plurality of upstanding posts 168 (FIG. 1). The posts 168 hold the plate 167 in spaced relation to the tool carrier plate P and secure the plates 167 and P together for vertical reciprocating movement.

Referring to FIGURE 9, it will be seen that the slidable actuating rod 160 is pivotally connected at its upper end to a connecting link 172 that is rotatably journalled by means of a bearing 174 on a stub shaft 176 which is formed eccentrically on one end of a short cylindrical shaft 178. The shaft 178 has, at its other end, a recess 180 that is disposed on the axis of shaft 178 and is adapted to receive an eccentric stub shaft 182 projecting from a drive shaft 183 that is journalled in a bearing assembly 184 which is mounted in fixed position on the plate 167 by posts 185 (FIG. 2). With this arrangement, as the drive shaft 183 is rotated, connector link 172 and the actuating rod 160 are reciprocated along a vertical path.

The drive shaft 183 is driven by a motor 190 (FIG. 1) through a belt and pulley driven mechanism 192 which includes a variable speed pulley 194, a pulley 195 which is keyed to a shaft 196 and a belt 197. The shaft 196 drives a shaft 200 through a belt and pulley arrangement 202, and the shaft 200 in turn drives the shaft 183 through a belt and pulley mechanism 204. As disclosed in the aforementioned Belk and Polk application, the blades of all four heads are vibrated by an eccentric drive mechanism similar to the mechanism 130 and in the manner just described. The shaft 183 drives the eccentric vibrating mechanisms 130 of two of the heads, and also drives a shaft (not shown) which drives the eccentric mechanisms associated with the other two heads. Since the present invention is concerned only with the mounting of the blades whereby straight line vertical movement of the blades is attained and since all blades are mounted in the manner illustrated in FIG. 4, a discussion of each head will not be given. To practice the present invention it is only necessary to know that the eccentric mechanism 130 converts rotary movement of a continuously rotated shaft to vertical reciprocating movement of the blades, and that the carrier unit 83 of each blade permits this vertical movement while preventing the swinging movement of the blade relative to the associated pivot member 77.

Each sectionizing blade 115 has a flat body portion 210 which has a lower tapered end 211 that terminates in a toothed probe or cutter 212. The probe 212, which has a plurality of cutting teeth 213 formed thereon, is twisted out of the plane of the body portion 210 at an angle of approximately 56° relative thereto. As mentioned previously, during the sectionizing operation, the blade 115 is rapidly reciprocated in a vertical direction. A hold down member 215 (FIG. 2) is mounted on the lower end of a rod 217 which carries, at its upper end, a cylindrical weight 218 slidably journalled in a fixed tube 219. When the head 42 is moved downwardly to engage the fruit, the hold down member 215 rests on the upper surface of the fruit.

In FIG. 7 is shown a sectional view of a portion of a grapefruit G, said portion having three pie-shaped meat segments S1, S2 and S3. When a blade 115 of each of the sectionizing heads 42 is initially moved downwardly, the probe 212 penetrates a pie-shaped meat segment, as for example segment S2, near the apex of the segment. It is desirable that, after the probe penetrates a short distance into the meat segment, the cutter be moved toward either the forward membrane FM or the rearward radial membrane RM to "find" or contact the membrane so that the blade will be close against the membrane as it is subsequently moved downwardly. Accordingly, before the probe enters the grapefruit, the entire blade control unit 70 is pivoted about the shaft 72 to move the blade away from the membrane which it will subsequently seek out. Since both membranes of each meat segment must be separated from the meat segment, two of the four sectionizing heads are arranged so that their blades seek out the forward membranes while the other two heads are arranged so that their blades seek out the rear membranes. One of the heads which seeks out a front membrane FM will be described, it being understood that the other heads are identical. Therefore, in the operation to be described, the blade control unit will first be pivoted clockwise about shaft 72 (FIG. 7) to move the blade to a cocked position spaced from the plane of the front membrane FM.

The preliminary cocking movement of each head is effected by means of a solenoid 230 (FIGS. 2 and 6) that is bolted to the undersurface of the plate P and has a plunger 231 connected to a link 232 that overlies an actuator ring 233.

The ring 233 is disposed inside the stationary ring 50, with an annular bearing assembly 235 (FIG. 2) disposed between the rings. The bearing assembly 235 is held in place by short hold down plates 236 (FIG. 6) which are secured to the rings 50 and 115 by capscrews 237. The solenoid link 232 carries a depending arm 238 (FIG. 2) that is secured to the inner ring, as by a capscrew 239. When the solenoid 230 is energized, the link 232 is pulled to the left (FIG. 6) against the resistance of a coil spring 240 that is connected between the link 112 and one of the fixed blocks 55. Movement of the link to the left causes the actuator ring 233 to be rotated a short angular distance in a counterclockwise direction. Counterclockwise movement of the ring is transmitted to the blade control units by five spaced U-shaped members 242 that are secured to the undersurface of the ring 233 by capscrews 243 (FIG. 6). The legs of each U-shaped member straddle the upper end of the blade carrier tube 82 and, accordingly, when the ring 233 is rotated, all the blade holders will be contacted and the blade control units will be swung clockwise about the fixed shafts 72, bringing each blade 115 to the position shown in full lines in FIG. 7.

When the head is subsequently moved downwardly and the probe has penetrated the grapefruit about one-half inch, the downward movement is stopped, and the solenoids 230 are de-energized, permitting each blade control unit to be swung counterclockwise about shaft 72 by a torsion spring 250 (FIGS. 2 and 3) which has one end secured to the shaft 72 by a capscrew 252 and the other end secured to a rigid ring 254. The ring 254 is fixed on the upper end of the pivot member 77, as by a capscrew 255 so that, when the blade control unit 70 is swung clockwise by the solenoid-actuated ring 233, the torsion spring will be wound up or stressed. Then, when the solenoid is de-energized and the blade control unit is released, the torsion spring resiliently moves the control unit counterclockwise causing the probe of the blade to be resiliently urged toward the adjacent membrane to assume the position shown in dotted lines in FIG. 7.

The spring 235 connected to the solenoid link 232 will rotate the ring 233 clockwise to bring the U-shaped actuator members 242 to their initial position. It will be understood that, when each U-shaped member is in its initial position, the legs of the member are spaced from the blade holder 85 so that the U-shaped members do not interfere with the movement of the resiliently urged, membrane-seeking probe.

It will be noted in FIG. 7 that, when the blade 115 reaches its dotted line operating position, the probe is engaged with the membrane but the body of the blade overlies the membrane. This overlying position of the blade is brought about by a torsion spring 260 (FIG. 2) that is anchored at one end in a capscrew 261 that is threaded into a support member 262 (FIG. 4). The member 262 extends upwardly through an opening in the arm 77b of the pivot member 77. A nut 264 clamps the support member on arm 77b. The spring 260 has an end portion 261 disposed in contact with a pin 263 that is fixed to and projects upwardly from the blade 115. The spring urges the pin against a pivotal stop lever 265 (FIG. 7) that is freely pivoted on a reduced diameter portion of the support member 262 (FIG. 4) and is disposed between the enlarged head of member 262 and arm 77b.

As seen in FIG. 7, the stop lever 265 has an end portion 266 against which the torsion spring 260 holds the pin 263 of the blade. Thus the position of the blade relative to a radial line passing through the axis of the grapefruit is controlled by the spring 260 and the stop lever 265. An adjustable stop arm 270 is secured to the lower end of the fixed shaft 72 and has an upturned end portion 272 disposed alongside an end 265a of the stop lever 265.

It will be noted in FIG. 7 that, in each position to which the blade 115 is urged by the swinging movement of the blade control unit 70, the blade 115 is disposed almost in a radial plane of the grapefruit. Therefore, if the initial downward movement of the head causes the blade 115 to penetrate the grapefruit adjacent a membrane so that no laterally shifting of the head is necessary, the blade is ready for this downward movement since it is disposed almost radially of the grapefruit but slightly overlying the membrane.

The substantially radial position of the blade 115 is obtained automatically due to the fact that, as the control unit 70 is swung counterclockwise (FIG. 7), the end 265a of lever 265 tends to move away from the fixed stop 270. However, the spring 260, acting through pin 263, rotates lever 265 counterclockwise also. Thus the pin 263 is allowed to shift its position on lever 265 to maintain the blade in a generally radial plane.

In operation, when the tool carrier plate P is in its elevated position, the solenoid 230 is energized to rotate the inner ring 233 and pivot the blade 115 to the full line, cocked position of FIG. 7. In this position, the spring 260 is urging the blade 115 against the end 265a of the stop lever 265. The carrier plate P is then moved downwardly to cause the probe on the lower end of the blade 115 to penetrate into the grapefruit. When the probe has penetrated to a depth of about one-half or five-eighths of an inch, the downward movement of the carrier plate is stopped and the solenoid 230 is de-energized, permitting the torsion spring 250 to swing the blade control unit about the fixed shaft 72 if necessary to the dotted line position of FIG. 7. In this position, the blade overlies the front radial membrane FM and the leading edge of the probe is in abutting contact with the face of the membrane. It is to be particularly noted that each probe moves laterally toward the adjacent membrane under the resilient urging of a spring and, accordingly, this lateral movement will stop when the relative tough membrane is contacted. Accordingly, each blade of each head moves independently of the other blades and adapts it movement to the distance it must travel to contact the membrane.

When all of the probes are in engagement with the associated membranes, the carrier plate P is again moved downwardly. During this downward movement the blades are independently vibrated in a vertical direction by its vibrating mechanism 139 to cause the blades to separate the meat segments from the radial membranes.

From the foregoing description it will be apparent that the blade carrier 83 of the present invention provides a simple, efficient mechanism for permitting straight-line vertical reciprocating movement of a sectionizing blade as the blade is moved in a generally horizontal direction during a sectionizing operation.

It will be understood that modifications and variations may be effected without departing from the scope of the present invention as defined by the claims appended hereto.

Having thus described my invention, what I claim as new and desire to protect by Letters Patent is:

1. In a citrus fruit sectionizing machine, a support, a blade control member mounted for pivotal movement on said support about a substantially vertical axis and having rigid guide means projecting laterally from the pivot axis of said blade control member, a blade carrier mounted for pivotal movement about a substantially vertical axis and sliding vertical movement in said guide means parallel to said axis, drive means for rapidly reciprocating said carrier in said guide means, and means operatively connected between said blade control member and said blade carrier for preventing pivotal movement of said carrier relative to said control member during vertical reciprocating movement of said carrier.

2. In a citrus fruit sectionizing machine, a support, a blade control member mounted on said support for pivotal movement about a generally vertical axis, tubular guide means on said control member spaced from the pivot axis of said control member, a blade carrier having a tubular portion mounted for vertical sliding movement in said tubular guide means and having a blade-support portion projecting radially outwardly from said axis, drive means for rapidly reciprocating said carrier relative to said guide means, a pair of spaced abutment members on said control member, and a projection formed on said blade carrier and having a portion disposed between said abutment members.

References Cited in the file of this patent

UNITED STATES PATENTS

| | | |
|---|---|---|
| 441,903 | Scholl | Dec. 2, 1890 |
| 2,210,733 | Schmid | Aug. 6, 1940 |
| 2,867,070 | McCall | Jan. 6, 1959 |